US008804809B2

(12) United States Patent
Raphaeli et al.

(10) Patent No.: US 8,804,809 B2
(45) Date of Patent: Aug. 12, 2014

(54) TECHNIQUES FOR SETTING FEEDBACK COEFFICIENTS OF A PAM-N DECISION FEEDBACK EQUALIZER

(75) Inventors: Dan Raphaeli, Kfar Saba (IL); Yaron Slezak, Raanana (IL)

(73) Assignee: TranSwitch Corporation, Shelton, CT (US)

( * ) Notice: Subject to any disclaimer, the term of this patent is extended or adjusted under 35 U.S.C. 154(b) by 216 days.

(21) Appl. No.: 13/230,244

(22) Filed: Sep. 12, 2011

(65) Prior Publication Data

US 2013/0064281 A1    Mar. 14, 2013

(51) Int. Cl.
*H03H 7/30* (2006.01)

(52) U.S. Cl.
USPC ........................................ 375/233

(58) Field of Classification Search
USPC ........ 375/231–233, 240.06, 240.07; 708/305, 708/322, 323
See application file for complete search history.

(56) References Cited

U.S. PATENT DOCUMENTS

| | | | |
|---|---|---|---|
| 5,056,117 A | 10/1991 | Gitlin et al. | |
| 5,742,642 A | 4/1998 | Fertner | |
| 6,505,222 B1 * | 1/2003 | Davis et al. | 708/323 |
| 6,904,110 B2 | 6/2005 | Trans et al. | |
| 7,023,938 B1 | 4/2006 | Kapoor et al. | |
| 7,436,881 B2 | 10/2008 | Nedic et al. | |
| 7,447,262 B2 | 11/2008 | Tseng et al. | |
| 8,416,673 B1 * | 4/2013 | Hovakimyan et al. | 370/201 |
| 2003/0182619 A1 * | 9/2003 | Greiss et al. | 714/798 |
| 2006/0256849 A1 * | 11/2006 | Tseng et al. | 375/232 |
| 2007/0047637 A1 * | 3/2007 | Lee | 375/233 |
| 2008/0056403 A1 | 3/2008 | Wilson | |
| 2010/0260253 A1 | 10/2010 | Hovakimyan et al. | |

* cited by examiner

*Primary Examiner* — Young T. Tse
(74) *Attorney, Agent, or Firm* — Pearl Cohen Zedek Latzer Baratz LLP

(57) ABSTRACT

A decision feedback equalizer (DFE) for equalizing PAM-N signals comprises a coefficient setting unit for setting a first group of most significant feedback coefficients of the DFE to a predefined value selected from a group of predefined values; a coefficients computation unit coupled to the coefficient setting unit for computing values of feedback coefficients of a second group of feedback coefficients other than the first group of most significant feedback coefficients; a feedback (FB) unit for mitigating, using a complete group of feedback coefficients, effects of interference from data symbols that are adjacent in time to an input data symbol, wherein most significant feedback coefficients of the first group are set to an optimal value computed during an initialization of the DFE and feedback coefficients of the second group are computed by the coefficients computation unit.

23 Claims, 3 Drawing Sheets

TECHNIQUES FOR SETTING FEEDBACK COEFFICIENTS OF A PAM-N DECISION FEEDBACK EQUALIZER

TECHNICAL FIELD

The invention relates to decision feedback equalizers, and more particularly, to setting the coefficients and reference voltage levels of a decision feedback equalizer that equalizes a PAM-N signal.

BACKGROUND OF THE INVENTION

High-speed interface links connecting two devices over a physical cable are typically serial communication links. Examples for such links include, but are not limited to, a high-definition multimedia interface (HDMI), a digital video interface (DVI), DisplayPort (DP), Universal Serial Bus 3 (USB3), and others.

During the process of data transmission, a transmitter continuously transmits signals to a receiver over the physical medium (cable). Typically, the physical cable exhibits the characteristics of a low-pass filter. Therefore, the amplitude of the data, received at the receiver, is attenuated and the phase is distorted. Also, the physical cable typically consists of wires which are not perfectly shielded. Thus, noise is present in the data due to cross coupling between signals from different wires.

The process of correcting the cable induced distortion is called equalization. This process can be performed by a decision feedback equalizer (DFE) that suppresses distortions caused by previously transmitted signals according to the continuously estimated impulse response of the interface between the transmitter and receiver. In practice, a DFE equalizes signals based on various parameters, such as digital filter taps or feedback coefficients, which are adjusted on the basis of estimated channel characteristics. The feedback coefficients are set to subtract the effects of interference from signals (e.g., symbols) that are adjacent in time to the desired signal (symbol). Typically, the coefficients are selected and adjusted using a least mean squares (LMS) algorithm.

An exemplary diagram of a decision feedback equalizer (DFE) 100 is provided in FIG. 1. The feedback filter 110 is used to adjust the tap coefficients. The number of feedback coefficients in the feedback filter 110 determines the number of previous symbol decisions which affect the current DFE decisions. With this aim, the feedback filter 110 attempts to model the distortion in a current signal to be equalized (input signal $I_n$) based on previously transmitted symbols using an LMS algorithm. A slicer 120 detects the value of the symbol that best corresponds to a value $Out_n$ that an adder 130 outputs to detect a symbol signal SYM. A difference between the input to the slicer 120 $Out_n$ and the output of the slicer 120 SYM is the symbol error $E_n$ computed by an adder 140. In an ideal system, the symbol error $E_n$ should essentially be zero. That is, the output $Out_n$ of the adder 130 should correspond to the received signal ($I_n$) for the current symbol. The voltage levels generator 150 adjusts the reference voltage levels that define the crossing points of the slicer 120.

Transmitted serial signals can be modulated using, for example, N-pulse amplitude modulation (PAM-N), where N discrete voltage levels are used to encode input bits. The two common PAM techniques utilized to modulate high-speed serial signals are PAM-2 (also known as non-return-to-zero "NRZ") or PAM-4. In a PAM-2, two levels are used to encode a single bit. In a PAM-4, two bits are mapped to one of four possible differential voltage levels, for example, +3 volts, +1 volt, −1 volt, and −3 volts. Demodulation is performed by detecting the amplitude level of the carrier at every symbol period. The PAM-4 allows transmitting signals at double the rate of the PAM-2 signal, but the loss of PAM-4 modulated signals is higher than that of PAM-2 modulated signals. Experiments have shown that when the loss of the physical medium is more than 10 dB, the PAM-4 had been used in preference to PAM-2.

When transmitting PAM-4 modulated signals, the error rate and the transmission rate of the signals are both higher in comparison to PAM-2. Thus, in order to correctly detect PAM-4 transmitted signals, the DFE should quickly equalize the signals to allow for reduction in the error rate.

One of the difficulties when implementing a DFE to equalize PAM-4 and higher modulation signals is that the timing circuit interferes with the operation of the LMS algorithm and the joint operation of both does not always converge to the correct feedback coefficients. Further, there is no current solution for a DFE that can monitor the equalizer's quality.

SUMMARY OF THE INVENTION

Certain embodiments disclosed herein include a decision feedback equalizer (DFE) for equalizing N-pulse amplitude modulation (PAM-N) signals. The DFE comprises a coefficient setting unit for setting a first group of most significant feedback coefficients of the DFE to a predefined value selected from a group of predefined values; a coefficients computation unit coupled to the coefficient setting unit for computing values of feedback coefficients of a second group of feedback coefficients other than the first group of most significant feedback coefficients; a feedback (FB) unit for mitigating, using a complete group of feedback coefficients, effects of interference from data symbols that are adjacent in time to an input data symbol, wherein most significant feedback coefficients of the first group are set to an optimal value computed during an initialization of the DFE and feedback coefficients of the second group are computed by the coefficients computation unit, wherein the complete group of feedback coefficients include the first and second groups of feedback coefficients; a calibration module for computing voltage levels of a PAM-N signal and for computing a value of a quality parameter utilized to determine the optimal value for the feedback coefficients in the first group of most significant feedback coefficients; and an error-and-decision unit for at least computing an error value indicating the sum of errors of an input symbol of the input data symbol from optimal positions of the voltage levels of the PAM-n signal.

Certain embodiments disclosed herein also include a method for adjusting the feedback coefficients of a N-pulse amplitude modulation (PAM-N) decision feedback equalizer (DFE). The method comprises inputting to the DFE a PAM-2 signal having two voltage levels; iteratively, for each predefined value in a group of predefined values performing: setting at least one most significant feedback coefficient to the predefined value selected from the group of predefined values; computing values of feedback coefficients of a second group of feedback coefficients, wherein the at least most significant feedback coefficient and the second group of feedback coefficients are feedback coefficients utilized by the DFE to equalize a PAM-N input signal; computing first voltage levels of a PAM-2 signal, the first voltage levels are being used as crossing points by the DFE; waiting for the computed values of feedback coefficients of the second group of feedback coefficients and the first voltage levels to converge; measuring converged values of the first voltage levels; computing second voltage levels of a PAM-2 signal as new crossing points of the DFE, the second voltage levels are computed with a deliberate offset; waiting for the computed values of the second voltage levels to converge; measuring converged values of the second voltage levels; computing a value of a quality parameter based on the converged values of the first voltage levels and the second voltage levels; and determining the predefined value of the at least one most significant feedback coefficient that results in a minimal value of the computed quality parameter as an optimal value for the at least one most significant feedback coefficient, wherein the minimal value of the quality parameter ensures a minimum error at the output of the DFE.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
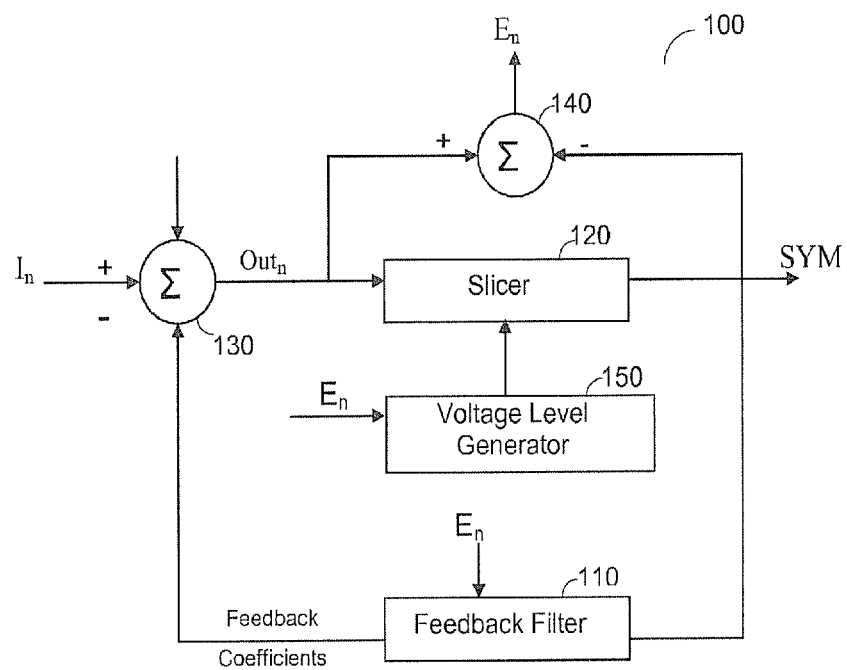
FIG. 1 is a schematic diagram of a conventional decision feedback equalizer (DFE).

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention enable the fast converge of feedback coefficients of a DFE utilized in PAM-N receivers. In a preferred embodiment, the techniques discussed herein are applicable to a DFE equalizing PAM-4 signals. The fast converge is achieved by setting one or more of the feedback coefficients to a predefined value, and computing the rest of the feedback coefficients using an LMS algorithm. That is, in contrast to prior art techniques, some but not all of the coefficients are determined based on the LMS algorithm. In addition, the disclosed techniques detect the set of feedback coefficients that results in the optimal equalization quality.

Figure 2:
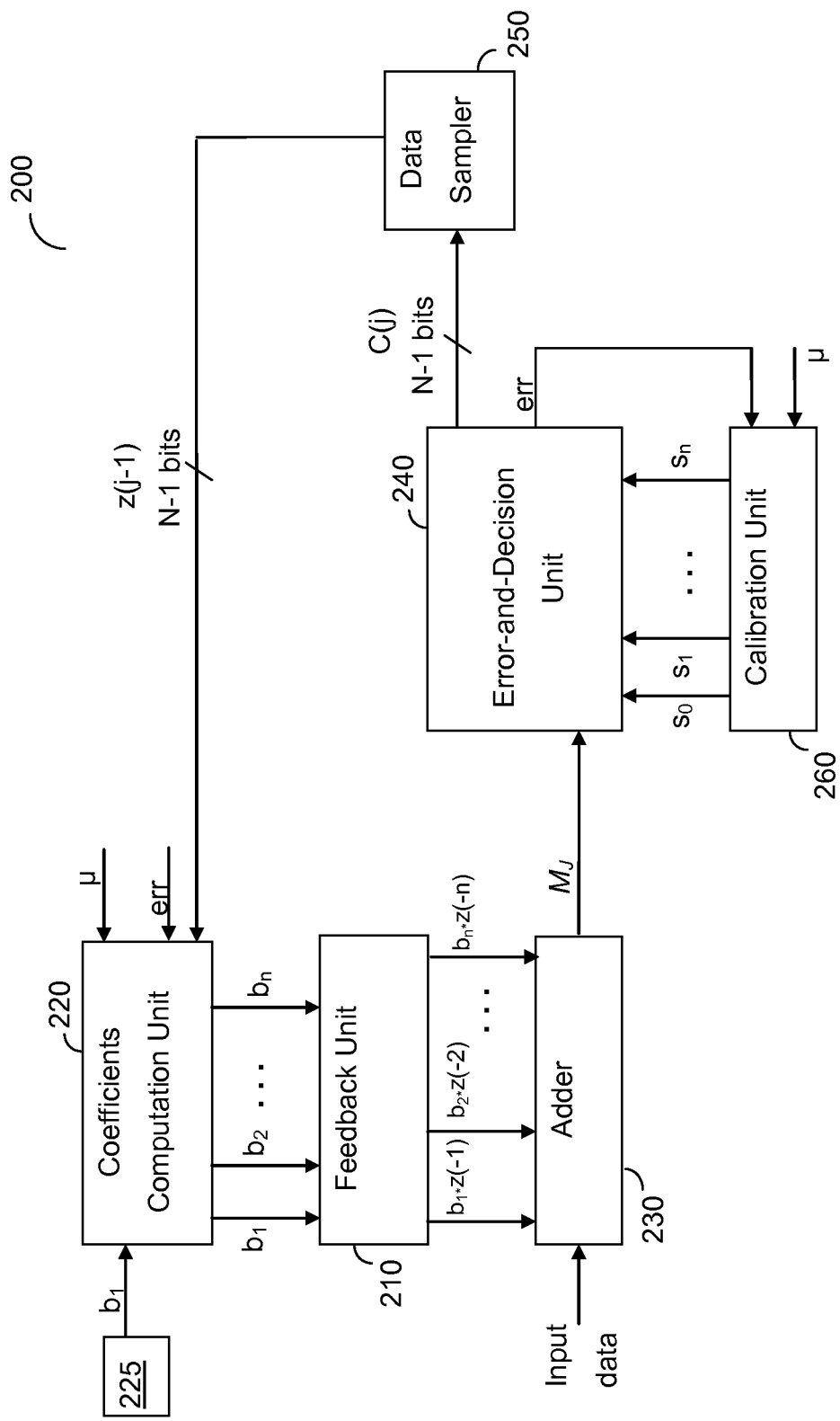
FIG. 2 is a block diagram of a DFE designed according to an embodiment of the invention.

FIG. 2 shows an exemplary and non-limiting block diagram of a DFE 200 constructed in accordance with an embodiment of the invention. The feedback coefficients of the DFE 200 are adjusted according to various embodiments of the invention disclosed in greater detail below.

The DFE 200 includes a feedback (FB) unit 210, a coefficients computation unit 220 coupled to a coefficient setting unit 225, an adder 230, an error-and-decision (ED) unit 240, a data sampler 250, and a calibration module 260.

The feedback unit 210, in one embodiment of the invention is a delay line with several delays, each of which corresponds to the symbol duration. The feedback coefficients b1, ..., bn are set to subtract the effects of interference from data symbols that are adjacent in time to the current received input data symbol. According to the embodiments of the invention, the coefficients are set using a scanning process in which one or more of the most significant coefficients are iteratively set to a predefined value, and the process determines the feedback coefficients that result in the best equalization quality.

Specifically, the coefficient setting unit 225 sets the most significant feedback coefficient, e.g., b1 to one of the predefined values and the coefficients computation unit 220 computes the rest of the coefficients, e.g., b2, ..., bn, using an LMS algorithm.

The LMS is an algorithm that approximates the steepest descent algorithm. The LMS algorithm is controlled by an adaptation coefficient $\mu$. The larger the adaptation coefficient is the faster the convergence. However, at some point the LMS algorithm becomes unstable. The LMS converges unconditionally to the minimum mean square error solution (MMSE) provided that the decisions (errors) are correct and that the adaptation coefficient is small enough.

The feedback coefficients $b_k$ (k=2, ..., n) are computed using the following equation:

$$b_k(j) = b_k(j-1) + \mu^* \text{sign}(\text{err}(j)^* z(j-k)) \quad [1]$$

where 'z' is the delayed Symbol, where 'k' is the tap being adjusted, '$\mu$' is the adaptation speed factor; the 'err' is an error value generated by the ED unit 240, and 'j' an index of the current bit being processed.

The scanning also includes calibrating the voltage levels of a PAM-N signal and measuring a value of the quality parameter. For example, a PAM-4 signal is modulated using four different levels: $S_0$=+3 volt; $S_1$=+1 volt; $S_2$=−1 volt; and $S_3$=−3 volt. The set of levels ($S_0$-$S_3$) are calibrated in the receiver using a calibration module 260. The calibration module 260 sets the values of the $S_0$ and $S_3$ first to values determined using the following equation:

$$S_k(j) = S_k(j-1) + \mu(\text{sign}(err(j))) \quad [2]$$

where 'k' is the level being computed (e.g., 0 or 3), $\mu$ is the adaptation speed factor, the 'err' value is generated by the ED unit 240, and 'j' an index of the current bit being processed. The calibration unit 260, its output, brings the S values to their optimal positions, as E[sign(err$_j$), k]=0, where E[ ] is the expectation operator. That is, at the optimal positions of $S_0$ and $S_3$, there are no phase errors. The 'err' value is the sum of errors of an input symbol M(j) from the optimal positions of the S values. Once the error value 'err' is small enough, i.e., below a predefined threshold, the S values are converged and then measured. In another embodiment, the method waits a predefined period of time which typically takes for the computed values (S and b) to converge. In an exemplary embodiment, this time period is 2.5 micro seconds for a Data-Rate of 2.5 Giga Symbols/Second.

Thereafter, in an embodiment of the invention, the calibration module 260 sets the values of the $S_0$ and $S_3$ to values determined using the following equation:

$$S_k(j) = S_k(j-1) + \mu^* \text{Sign}(err(j) + \alpha) \quad [3]$$

where $\alpha$ is a constant creating a deliberate offset. The levels of $S_0$ and $S_3$ are shifted to create an offset in the 'err' value and the value of this offset is proportional to the size of the error.

Once the S values are converged, they are measured by the calibration unit 260. The scanning for an optimal most significant feedback coefficient includes measuring $S_0$ and $S_3$ with and without the offset a. The quality parameter is also computed by the calibration unit 260. In an embodiment of the invention, the quality parameter is computed using the following equation:

$$\text{Quality} = ([S_0\alpha - S_0\text{ref}] + [S_3\alpha - S_3\text{ref}])/(-S_0\text{ref} + S_3\text{ref}) \quad [4]$$

where, $S_0\text{ref}$ and $S_3\text{ref}$ are the values converged and measured without $\alpha$, and $S_0\alpha$ and $S_3\alpha$ are the values converged and measured after insertion of the offset $\alpha$. This scanning for the optimal value b1 is performed for the set of predefined values. The optimal most significant value is saved and later utilized for the adjustment of the rest of the feedback coefficients. It should be further noted that the division by $(-S_0\text{ref} + S_3\text{ref})$ in the equation [4] is intended to normalize the error with the expected signal value. If the signal value is A and $-A$, then $S_0\text{ref} = -A$ and $S_3\text{ref} = A$. In reality this is not the case, as the S levels also compensate for offsets in the circuits of the DFE 200, thus $S_0\text{ref}$ and $S_3\text{ref}$ cannot be at the exact same absolute value.

The adder 230 computes the signal M(j) by subtracting from the input data symbols the sum of the feedback coefficients [b1, . . . , bn] multiplied by their respective delay (z). This is performed in order to ensure the output of the adder 230, M(j), corresponds to the current symbol, thus cancelling intersymbol interference (ISI) of the input data symbol. The data sampler 250 samples the bits at the output of the ED unit 240 and provides the sampled bits to the feedback unit 210.

Figure 3:
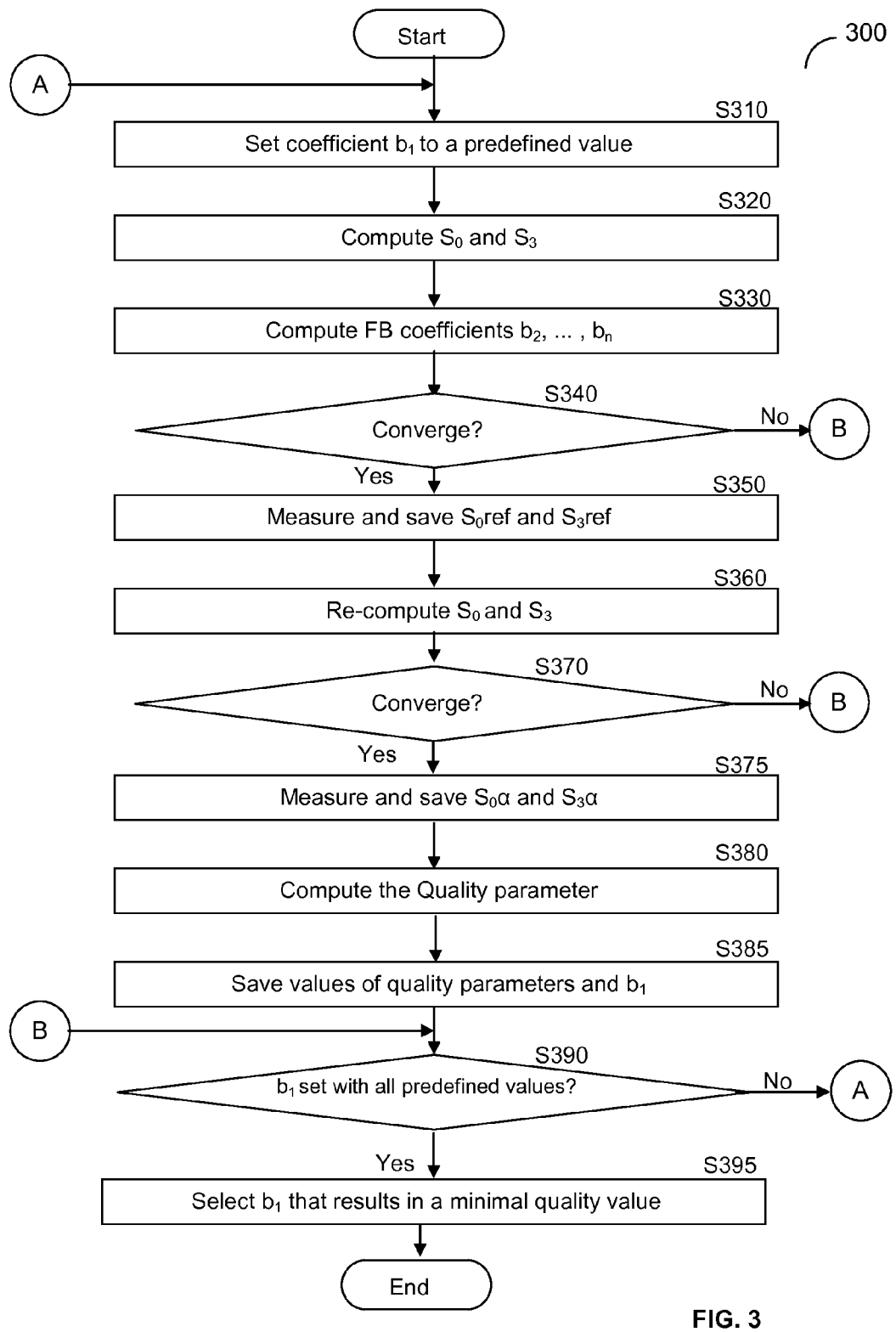
FIG. 3 is a flowchart illustrating a method for scanning the most significant feedback coefficient for an optimal coefficient value for a DFE according to an embodiment of the invention.

FIG. 3 shows an exemplary and non-limiting flowchart 300 describing the method for adjusting the feedback coefficients of a PAM-N DFE according to an embodiment of the invention. During the initialization of the receiver and DFE the value of the most significant feedback coefficient is determined, but the computation of rest of the coefficients and the levels of S values are performed also during the normal operation of the receiver.

At the initialization stage of the receiver and for the purpose of determining the optimal value for the most significant feedback coefficient ($b_1$), the input data is NRZ (or PAM-2) modulated, i.e., having two values +/−3 volts, which are referred to as $S_0$ and $S_3$ of the PAM-4 modulation.

At S310, the most significant feedback coefficient ($b_1$) of the feedback coefficients ($b_1$, . . . , $b_n$) is set to a predefined value. The predefined values are selected from a set of voltage values and include positive values and negative values. These voltage values may be determined based on possible values to the feedback coefficient $b_1$. In an optional step, the direction for scanning is first selected, i.e., whether the scanning will start from negative or positive values. The most significant coefficient dominates the convergence of the feedback coefficients in the feedback unit 210.

At S320, the PAM-4 voltage levels of the $S_0$ and $S_3$ are computed to new levels. According to an embodiment of the invention, the $S_0$ and $S_3$ are adjusted using the equation [2] by the calibration module 260.

At S330 the values of the feedback coefficients ($b_2$, . . . , $b_n$) are computed using the LMS algorithm. It should be noted that in an embodiment of the invention, S320 and S330 are performed at the same time.

At S340, the method waits for the feedback coefficients ($b_2$, . . . , $b_n$) and the $S_0$ and $S_3$ to converge. As mentioned above, this is achieved when the error value (err) computed by the ED unit 240 is small enough, i.e., if the error value is below a predefined value or after a predefined time period. When these values converged, the method continues with S350; otherwise, the method proceeds to S390 as a PAM-N error is detected. Such an error is detected if instead of measuring levels related to $S_0$ and $S_3$ (e.g., voltage levels close to +3 volts or −3 volts), values that are closer to $S_1$ or $S_2$ (e.g., voltage levels close to +1 volt or −1 volt) are measured. It should be appreciated that a PAM-4 error is a good indication that the DFE diverged. At S350, the output $S_0$ and $S_3$ are measured and saved as $S_0\text{ref}$ and $S_3\text{ref}$.

At S360, the PAM-4 voltage levels $S_0$ and $S_3$ are re-computed to new levels. According to an embodiment of the invention, the $S_0$ and $S_3$ are re-computed using the equation [3], described above by the calibration module 260. It should be noted that the deliberate offset '$\alpha$' used for the computation of equation [3] may be set to a predefined offset value. In an embodiment of the invention, the setting includes changing the value $\alpha$ from its default value (e.g., zero) to the predefined offset value (e.g., 0.2). Thus, for the computation of equation [3] the deliberate offset '$\alpha$' is set to a non-zero value. It should be noted that computation of the S values includes adjusting the crossing points at the ED unit 240.

At S370, the method waits for $S_0$ and $S_3$ to converge. When the new computed S values converge, the method continues with S375; otherwise, the method proceeds to S390 as a PAM-N error is detected. At S375, the converged $S_0$ and $S_3$ are measured and saved as $S_0\alpha$ and $S_0\alpha$ values.

At S380, a quality parameter is computed based on the measured levels $S_0$ and $S_3$ without and with the deliberate offset. According to an embodiment of the invention, the quality parameter is computed using equation [4] described above by the calibration module 260. At S385, the computed value of the quality parameter for the current iteration is saved together with the value set for the most significant feedback coefficient set at S310.

At S390, it is checked if the feedback coefficient b1 has been set to all of the predefined positive and negative values, and if not, execution continues with S310 where a different predefined value is selected and set to the coefficient $b_1$; otherwise, execution continues with S395.

At S395, the value of the most significant feedback coefficient $b_1$ associated with the quality parameter having the minimal value (such value represents the lowest error at the DFE's output) is selected. The selected value for the feedback coefficient $b_1$ is utilized during the normal operation of the receiver and DFE. This ensures that the DFE will quickly converge to optimal values of the feedback coefficients and optimal signal equalization will be achieved during the normal operation of the DFE and hence the receiver. It should be noted that once the most significant feedback coefficient $b_1$ has been set to its optimal value, as discussed herein, PAM-4 or higher modulation signals are equalized by the DFE based, in part, on the value selected at S395. That is, the DFE is switching from receiving of PAM-2 signal used for scanning for the optimal value of the most significant feedback coefficient.

The various embodiments of the invention may be implemented as any combination of hardware, firmware, and software. Moreover, the software is preferably implemented as an application program tangibly embodied on a program storage unit or computer readable medium. One of ordinary skill in the art would recognize that a "machine readable medium" or computer readable medium is a non-transitory medium capable of storing data and can be in a form of a digital circuit, an analogy circuit, a magnetic media or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention.

What is claimed is:

1. A decision feedback equalizer (DFE) for equalizing N-pulse amplitude modulation (PAM-N) signals, comprising:
    a coefficient setting unit for setting a first group of most significant feedback coefficients of the DFE to a predefined value selected from a group of predefined values;
    a coefficients computation unit coupled to the coefficient setting unit for computing values of feedback coefficients of a second group of feedback coefficients other than the first group of most significant feedback coefficients;
    a feedback (FB) unit for mitigating, using a complete group of feedback coefficients, effects of interference from data symbols that are adjacent in time to an input data symbol, wherein the most significant feedback coefficients of the first group are set to an optimal value computed during an initialization of the DFE and the feedback coefficients of the second group are computed by the coefficients computation unit, and wherein the complete group of feedback coefficients includes the first and second groups of feedback coefficients;
    an error-and-decision unit for at least computing an error value indicating the sum of errors of an input symbol of the input data symbol from optimal positions of the voltage levels of the PAM-N signals; and
    a calibration unit for computing, based on the error value, the voltage levels of the PAM-N signals and a value of a quality parameter utilized to determine the optimal value for the feedback coefficients in the first group of most significant feedback coefficients.

2. The DFE of claim 1, further comprising:
    an adder for cancelling intersymbol interference (ISI) of the input data symbol by subtracting from the input data symbol a sum of signals outputted by the feedback unit; and
    a data sampler for sampling data bits output by the error-and-decision unit and feeding the sampled bits to the coefficients computation unit.

3. The DFE of claim 1, wherein the group of predefined values includes positive voltage values and negative voltage values.

4. The DFE of claim 1, wherein the feedback coefficients in the second group of feedback coefficients are computed using a least mean squares (LMS) algorithm.

5. The DFE of claim 1, wherein the optimal value is associated with a minimal computed value of the quality parameter, wherein the minimal computed value of the quality parameter ensures a minimum error at the output of the error-and-decision unit.

6. The DFE of claim 5, wherein computing the optimal value during the initialization of the DFE comprises:
    inputting to the DFE a PAM-2 signal having two voltage levels;
    iteratively, for each predefined value out of the group of predefined values that the most significant feedback coefficients of the first group set with, measuring first converged values of the two voltage levels without an offset and second converged values of the two voltage levels with an offset; and
    computing the value of the quality parameter as a normalized sum of the difference between the respective voltage levels with and without the offset.

7. The DFE of claim 6, wherein the calibration unit is configured to compute the first converged values of the two voltage levels without the offset as follows: $S_k(j)=S_k(j-1)+\mu(\text{sign}(err(j)))$, wherein k is one of the two voltage levels, $\mu$ is an adaptation speed factor, err is the error value generated by the error-and-decision unit, and j is an index of an input bit being processed.

8. The DFE of claim 7, wherein the calibration unit is further configured to compute the second converged values of the two voltage levels with the offset as follows: $S_k(j)=S_k(j-1)+\mu*\text{Sign}(err(j)+\alpha)$, wherein $\alpha$ is the offset.

9. The DFE of claim 8, wherein a value of the offset is a constant value creating a deliberate offset.

10. The DFE of claim 9, wherein the calibration unit is further configured to compute the quality parameter as follows:
    Quality parameter=$([S_0\alpha-S_0\text{ref}]+[S_3\alpha-S_3\text{ref}])/(-S_0\text{ref}+S_3\text{ref})$, wherein $S_0\text{ref}$ and $S_3\text{ref}$ are the first converged values without the offset, and $S_0\alpha$ and $S_3\alpha$ are the second converged values with the offset.

11. The DFE of claim 6, wherein the calibration unit is configured to measure the first converged values and the second converged values once the feedback coefficients of the second group of feedback coefficients converge.

12. The DFE of claim 11, wherein the first converged values, the second converged values, and the feedback coefficients of the second group of feedback coefficients converge when the error value is below a predefined threshold or when a predefined time period has elapsed.

13. The DFE of claim 1, wherein the PAM-N signals are at least PAM-4 modulated signals.

14. A method for adjusting the feedback coefficients of a N-pulse amplitude modulation (PAM-N) decision feedback equalizer (DFE), comprising:
    inputting to the DFE a PAM-2 signal having two voltage levels;
    iteratively, for each predefined value in a group of predefined values performing: setting at least one most significant feedback coefficient to a predefined value selected from the group of predefined values;
    computing values of feedback coefficients of a second group of feedback coefficients, wherein the at least one most significant feedback coefficient and the second group of feedback coefficients are feedback coefficients utilized by the DFE to equalize the PAM-2 input signal;
    computing first voltage levels of the PAM-2 signal, the first voltage levels are being used as crossing points by the DFE;
    waiting for the computed values of feedback coefficients of the second group of feedback coefficients and the first voltage levels to converge;
    measuring converged values of the first voltage levels;
    computing second voltage levels of the PAM-N signal as new crossing points of the DFE, the second voltage levels are computed with a deliberate offset;
    waiting for the computed values of the second voltage levels to converge;

measuring converged values of feedback coefficients of the second group of feedback coefficients and the second voltage levels;

computing a value of a quality parameter based on the converged values of the first voltage levels and the converged values of the second voltage levels; and determining the predefined value selected from the group of predefined values of the at least one most significant feedback coefficient that results in a minimal value of the computed quality parameter as an optimal value for the at least one most significant feedback coefficient, wherein the minimal value of the quality parameter ensures a minimum error at the output of the DFE.

15. The method of claim 14, wherein the group of predefined values includes positive voltage values and negative voltage values.

16. The method of claim 14, wherein the feedback coefficients in the second group of feedback coefficients are computed using a least mean squares (LMS) algorithm.

17. The method of claim 14, wherein the first voltage levels are computed as follows: $S_k(j)=S_k(j-1)+\mu(\text{sign}(\text{err}(j)))$, wherein k is one of the two voltage levels of the PAM-2 signal, $\mu$ is an adaptation speed factor, err is an error value computed by the DFE as a sum of errors of an input symbol from optimal positions of the two voltage levels, and j is an index of a current bit being processed.

18. The method of claim 17, wherein the second voltage levels are computed as follows: $S_k(j)=S_k(j-1)+\mu*\text{Sign}(\text{err}(j)+\alpha)$, wherein $\alpha$ is the deliberate offset.

19. The method of claim 18, wherein the deliberate offset is a constant.

20. The method of claim 19, wherein the value of the quality parameter is computed as follows:

Quality parameter=$([S_0\alpha-S_0\text{ref}]+[S_3\alpha-S_3\text{ref}])/(-S_0\text{ref}+S_3\text{ref})$, wherein $S_0\text{ref}$ and $S_3\text{ref}$ are the converged values of the first voltage levels, and $S_0\alpha$ and $S_3\alpha$ are the converged values of the second voltage levels with the deliberate offset.

21. The method of claim 20, wherein the first voltage levels, the second voltage levels and the feedback coefficients of the second group of feedback coefficients converge when the error value is below a predefined threshold or when a predefined time period has elapsed.

22. The method of claim 14, wherein the determination of the optimal value for the at least one most significant feedback coefficient is performed during initialization of the DFE.

23. A non-transitory computer readable medium having stored thereon instructions for causing one or more processing units to execute the method according to claim 14.

* * * * *